May 15, 1956  E. F. HISCOCK  2,745,335
COFFEE MAKERS
Filed July 18, 1950 2 Sheets-Sheet 1
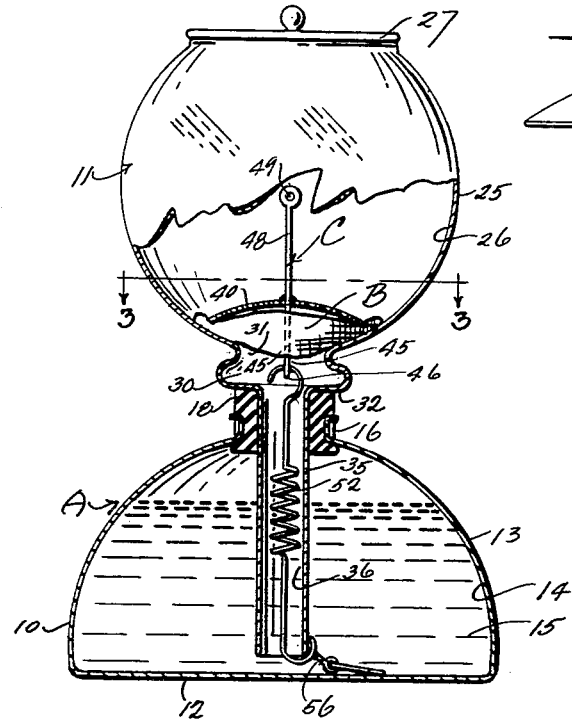
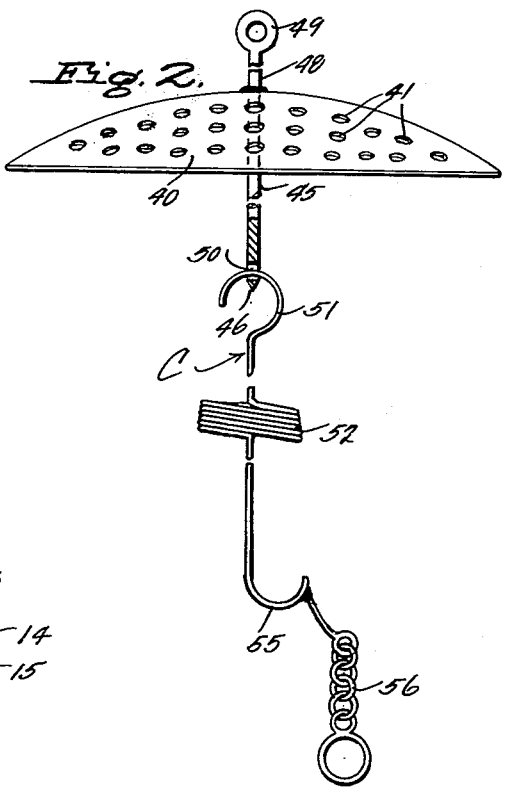
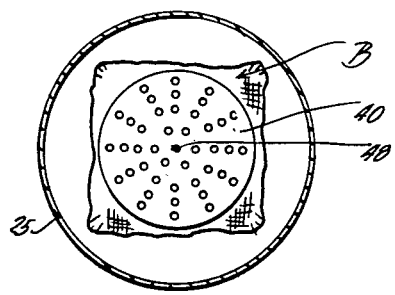
INVENTOR.
Earle F. Hiscock.
BY
ATTORNEYS.

May 15, 1956  E. F. HISCOCK  2,745,335
COFFEE MAKERS
Filed July 18, 1950　　　　　　　　　　　2 Sheets-Sheet 2
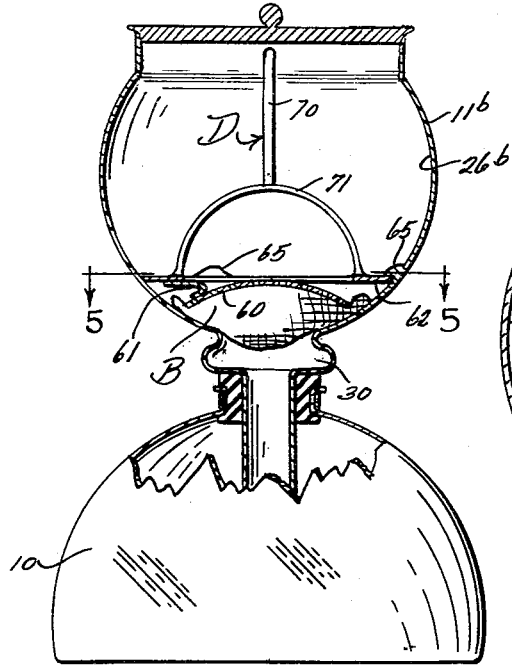
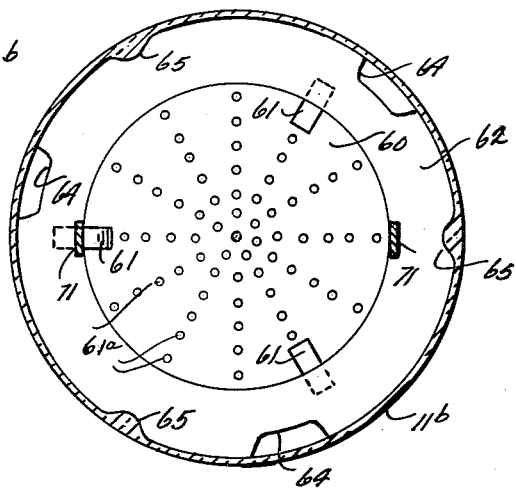
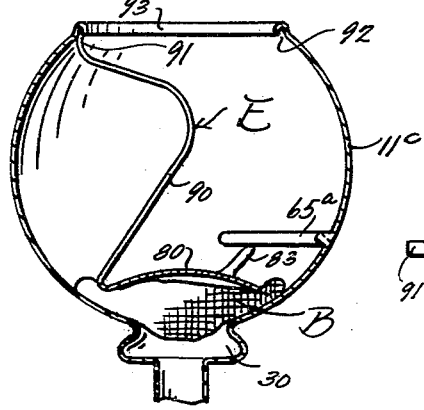
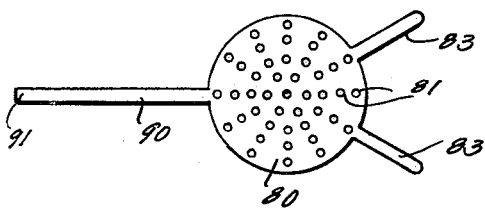
INVENTOR.
*Earle F. Hiscock*
BY *Lancaster, Allwine & Rommel*
ATTORNEYS.

United States Patent Office 2,745,335
Patented May 15, 1956

2,745,335

COFFEE MAKERS

Earle F. Hiscock, Washington, D. C., assignor to Kip, Inc., Washington, D. C., a corporation of Delaware Application July 18, 1950, Serial No. 174,476

3 Claims. (Cl. 99—295)

This invention relates to improvements in coffee makers.

The primary object of this invention is the provision of an improved vacuum type coffee maker having improved means for yieldably holding a packet or unit of coffee in such manner as to most efficiently control the brewing action.

A further object of this invention is the provision of improved means for resiliently holding a packet or unit of coffee within a coffee maker of the vacuum brewing type.

Other objects and advantages of the invention will be apparent during the course of the following detailed description.

In the accompanying drawings, forming a part of this specification, and wherein similar reference characters designate corresponding parts thruout the several views—

Figure 1 is a cross sectional view of a vacuum type coffee maker, possessing some of the characteristics of the coffee maker set forth in my co-pending application Serial No. 142,670, filed February 6, 1950 (now abandoned), and thereover having improved means for maintaining the coffee packet in efficient brewing position within the maker.

Figure 2 is a fragmentary side elevation of an improved device for properly maintaining a packet or unit of coffee within the coffee maker.

Figure 3 is a cross sectional view thru the coffee maker taken substantially on the line 3—3 of Figure 1.

Figure 4 is a cross sectional view taken thru a modified form of coffee maker, wherein other means is provided for yieldably holding the packet or unit of coffee in proper position within the coffee maker to efficiently perform the brewing action.

Figure 5 is a transverse cross sectional view taken substantially on the line 5—5 of Figure 4.

Figure 6 is a cross sectional view taken thru a coffee maker of another modified form or means of maintaining the packet or unit of coffee within the maker.

Fig. 7 is a plan view showing the coffee packet holding means of the form of invention shown in Figure 6.

In the drawings wherein for the purpose of illustration are shown different forms of invention, the letter A may generally designate a coffee maker having certain improved features of the coffee maker of my above identified co-pending application (now abandoned), and wherein is adapted to be used a packet B containing infusible material, such as coffee, tea, etc. Improved means C is provided for properly holding the packet of coffee within the maker A. Modified forms of the means for holding the packet of coffee are shown at D and E in Figures 4 and 6 respectively of the drawings.

Referring to the coffee maker A, the same comprises a lower receptacle portion 10 and an upper receptacle portion 11. They are preferably fabricated of steel, aluminum, heat resistant plastic, glass, or other material. The lower receptacle portion 10 includes a flat bottom wall 12 having upwardly convergent dome-shaped walls 13 defining a compartment 14 adapted to receive boiling water or coffee liquor, designated at 15 in the drawings. The neck 16 of the receptacle portion 10 is reduced and receives a heat resistant and insulated plastic or synthetic rubber nipple or seat 18 having a passageway therethru.

The upper receptacle portion 11 includes a main bowl portion 25 of substantially a spherical shape, defining a compartment 26 opening at the top of the receptacle for receiving a detachable closure 27 of stainless steel, aluminum or other material. At its lower end the bowl portion 25 has integrally formed therewith a well 30 which has a reduced entrance 31 to the compartment 26. The well is wider below the entrance 31 and has a bottom wall 32 with a reduced integrally connected depending tube 35 provided with a passageway 36 therethru. The tube 35 is adapted to fit snugly in the passageway of the insulation collar 18, and it extends into the compartment 14 of the lower receptacle portion 10 in the usual manner.

The coffee units or packets B consist of an outer covering of uniformly knitted or woven synthetic yarn or other material, such as nylon or rayon. The packet casing is filled with ground coffee after the manner described in my above identified co-pending application Serial No. 142,670, filed February 6, 1950 (now abandoned).

It has been described in my application Serial No. 142,670 (now abandoned) that a weight may be used to hold the packet in proper position for brewing. The present invention contemplates the use of resilient means and a perforated or foraminous cover for properly maintaining the coffee packet in position within the maker, in order that there will be a squeezing action upon the packet, and thus enable the brewing to be most efficiently accomplished. To that end the means C shown in Figures 1, 2 and 3 of the drawings for holding the packet in position, consists of a segmental-shaped hold-down cap 40, which may be of plastic, aluminum or any other suitable material. It may be of mesh material and of course, if desired, is provided with perforations 41 therethru of a size and nature to permit a maximum amount of the liquid to pass therethru and thru the coffee packet without interfering with brewing action.

The member 40 centrally supports a packet penetrating shaft or pin 45, extending transverse to the concave side of the cap 40, and of a length to enable the same to penetrate the thickness of the packet B so that the pointed end 46 thereof projects beyond the lower part of the packet, as shown in Figure 1. The pin 45 has an upper portion 48 extending thereabove provided with a handle 49 to facilitate grasping of the coffee packet holding means C for removal and application purposes.

The pin 45 is provided with a transverse opening 50 therethru adapted to receive the hook end 51 of a spring 52. The latter is normally contracted and may be expanded to hold the cap 40 down upon the coffee packet, in the position shown in Figure 1. The lower end of the spring 52 is provided with a hook or other means 55 adapted to engage the lower margin of the tube 35 in order to assemble the device C in the position shown in Figure 1. A chain or cable 56 of suitable length may be connected with the hook 55 so that the device after threading thru the passageway 36 of the tube 35 may be grasped to pull the same into the position shown in Figure 1 where the hook 55 is engaged beneath the margin of the tube 35.

In the type of coffee maker shown in Figure 4, the receptacle portions are the same as above described for the form shown in Figure 1, and similar reference characters have been used in both of these forms. However, as shown in Figures 4 and 5, the means D for holding the packet B in position is confined entirely within the upper receptacle portion 11$^b$, within the compartment 26$^b$ thereof. The means D consists of a perforated concavo-convex segmental cap 60 of the same nature as the cap member 40 above described. It is of mesh or perforated material and provided with openings 61a therethru.

At the convex side of the cap 60 there is provided a flat retaining ring 62 of disc-shaped formation, having soldered or otherwise secured to the underside thereof spring arms 61. The latter are soldered or otherwise secured to the convex side of the packet hold-down cap 60. The arms 61 resiliently and yieldably support the cap 60 upon the ring 62. The ring 62 is provided with slots or recesses 64 inwardly from the outer marginal edge thereof, adapted to receive retaining lugs 65 which are integrally or otherwise connected upon the inner surface of the receptacle 11b, as shown in Figures 4 and 5 of the drawings. This lug and slot arrangement enables the ring or disc 62 to be retained beneath the lugs 65, from which position it may be readily removed. In this position the spring arms 61 are slightly compressed in order to resiliently hold the cap 60 upon the packet B. It is to be noted that it is not necessary to perforate the coffee packet B with the hold-down device D.

To facilitate handling of the device D, I may provide an axial handle or shaft 70 supported by arms 71; the latter being suitably secured to the ring 62, as shown in Figures 4 and 5 of the drawings.

In the use of the coffee maker shown in Figures 4 and 5 it is merely necessary to drop the packet B into the receptacle 11b, and it is then positioned above the well 30. The coffee packet retaining means D is then lowered into the receptacle and the slots 64 aligned with the lugs 65 until the ring portion 62 lies beneath the lugs 65. By giving a slight turn to the means D the lugs 65 will hold the ring 62 in position with the spring arms 61 compressed for resiliently urging the packet B into proper position above the well and against the inside surfaces of the receptacle portion 11b.

In the form of invention shown in Figures 6 and 7, a coffee packet retaining means E is provided. In that form the receptacle portion 11a of the coffee maker is modified by providing a retaining rib or boss 65a upon the inner wall thereof.

The coffee retaining means E preferably consists of a perforated segmental hold-down cap or disc 80 of the same nature as the caps 40 and 60 above described; being provided with perforations 81 therein. Radially and upwardly divergent arms 83 are provided, of a length that will enable the same to be slipped to the under side of the rib 65a in order to retain the cap 80 and the coffee packet B in position. The cap 80 furthermore includes a curved spring arm 90 secured to the periphery of the retaining segment 80. The same is of such length that the end 91 thereof may be hooked or engaged beneath a flange 92 surrounding the opening 93 of the receptacle portion 11c. In this position the arm 90 is under compression to resiliently urge the cap or retaining portion 80 upon the packet of coffee B, as shown in Figure 6.

It will be apparent from the foregoing that the hold-down devices for the coffee packets or units will most efficiently maintain them in the upward and downward stream of liquor. The caps will cover the major top area of the packets and consequently bear upon the main mass of coffee. The vapor and liquor have free access thru the permeable beverage containing bag or sack, and as a consequence of the increasing tensioning and release of the pressure against the sack by the venting action of lifting the bag, an intermittent squeezing action is provided upon the swollen coffee mass in the packet. The intensity of the action varies with the amount of heat applied to the coffee maker, as can readily be understood. The bag and parts are of such related size that the bag at all times will be maintained above the well chamber.

While it is intended that the retaining segments or caps of the various forms of invention be made of light-weight material, it can be made of heavier material so as to furnish a mass of weight which will assist in the squeezing action upon the packet. There will, of course, not be any violent spurts of the brewing liquor from the upper bowl, as is frequently the case with conventional vacuum coffee makers.

Various changes in the shape, size and arrangement of parts may be made to the form of invention herein shown and described without departing from the spirit of the invention or the scope of the following claims.

I claim:

1. In a vacuum type coffee maker the combination of upper and lower receptacle portions, the upper receptacle portion having a tube connected therewith depending into the lower receptacle portion, said tube having a passageway therethru communicating with said receptacle portions, a coffee packet including a flexible porous coffee containing casing mounted in the upper receptacle portion across said passageway, an extensible tension spring releasably disposed within the passageway of the tube having means releasably connected with the lower part of the tube and means at the opposite end thereof releasably connected to the packet so that the tension thereof will pull the packet into position across said passageway, said packet connecting means including a covering over the top major area of the packet, said spring being of such tension that as an incident of ebullition of liquid thru said passageway it will resiliently flex so that the packet will be given an intermittent squeezing action by said covering in the upper receptacle portion.

2. A vacuum type coffee maker comprising a lower receptacle portion having a chamber therein, an upper receptacle portion having a chamber therein, a tube having a passageway communicating said two chambers, said tube extending downwardly into the chamber of the lower receptacle portion, the upper receptacle portion having an interior wall surface marginally surrounding the passageway of said tube, a coffee packet including a flexible porous casing having coffee particles disposed and encased therein, said packet being of such size that it will extend entirely across said pasageway in marginal overlying position upon the interior wall surface of said upper receptacle portion, and means for holding said coffee packet in such position including a perforated cap covering the major mass of coffee in the packet, and spring means urging said cap against said packet with an urging force that will yield as an incident of ebullition of boiling liquid thru the tube from the lower receptacle chamber into the upper receptacle portion whereby to impart a squeezing action to the coffee packet and the coffee therein during such ebullition.

3. In a vacuum type coffee maker the combination of a lower receptacle portion having a chamber therein, an upper receptacle portion having a chamber therein, a tube connecting said chambers and extending downwardly into the chamber of the lower receptacle portion having a passageway which communicates said two chambers, a completely flexible packet including a porous flexible casing having a mass of ground coffee therein disposed in the upper receptacle portion and over said passageway of the tube and of a size that will not permit the same to drop through the passageway of said tube, a concavo-convex segmental shaped perforated cap resting upon and over the major mass of coffee of the packet at its concave side receiving the packet therein, and means yieldably urging said cap against said packet with a force only sufficient to permit the flexible unit and said cap to rise to a limited degree upon surge of liquor being forced upwardly through the passageway of the tube whereby to impart to said cap an intermittent squeezing action upon the major mass of coffee in the packet during movement of liquor through said tube.

(References on following page)

References Cited in the file of this patent

UNITED STATES PATENTS

| Number | Name | Date |
|---|---|---|
| 51,741 | Nason | Dec. 26, 1865 |
| 133,582 | Hofman | Dec. 3, 1872 |
| 177,173 | Theobald | May 9, 1876 |
| 515,008 | McClellan | Feb. 20, 1894 |
| 519,108 | Fontneau | May 1, 1894 |
| 785,693 | Brown | Mar. 21, 1905 |
| 871,492 | Dunlap | Nov. 19, 1907 |
| 1,083,900 | Brown | Jan. 6, 1914 |
| 1,454,739 | Holland | May 8, 1923 |
| 1,876,474 | Starkey | Sept. 6, 1932 |
| 1,947,523 | Hirschhorn | Feb. 20, 1934 |
| 2,084,839 | Dubois | June 22, 1937 |
| 2,175,440 | Masin | Oct. 10, 1939 |
| 2,283,967 | Brown | May 26, 1942 |
| 2,313,112 | Wolcott | Mar. 9, 1943 |
| 2,314,543 | Kopf | Mar. 23, 1943 |
| 2,370,096 | Walder et al. | Feb. 20, 1945 |
| 2,449,620 | Reichold | Sept. 21, 1948 |
| 2,460,735 | Carroll | Feb. 1, 1949 |
| 2,464,722 | Sacker | Mar. 15, 1949 |

FOREIGN PATENTS

| Number | Country | Date |
|---|---|---|
| 416,279 | France | Aug. 3, 1910 |
| 417,281 | Germany | Aug 11, 1925 |